Patented Feb. 23, 1932

1,846,247

UNITED STATES PATENT OFFICE

HERMAN A. BRUSON, OF AKRON, OHIO, ASSIGNOR TO THE GOODYEAR TIRE & RUBBER COMPANY, OF AKRON, OHIO, A CORPORATION OF OHIO

PREPARATION OF HALIDE ADDITION PRODUCTS, POLYMERS, AND OXIDES OF RUBBER

No Drawing. Application filed February 11, 1927, Serial No. 167,594. Renewed August 26, 1931.

My invention relates to the polymerization of rubber and it has, for its primary object, the formation of new addition products of rubber and metallic salts, and the formation of oxides and polymers of rubber.

It has been observed that some of the hydrocarbons which are closely related to rubber, such as isoprene, and the like, when treated with certain salts, form definite addition products, which contain a plurality of the usual hydrocarbon molecules linked together, probably, by the salt. When these addition products are subjected to proper treatment, as for example, the action of water, acetone, or alcohol, the salts split off, and the hydrocarbon molecules which remain so combine as to form a polymerization product whose molecular weight is in some cases many times that of the untreated hydrocarbon. The physical and chemical properties of the hydrocarbon are greatly altered. The above compound, for example, gives a polymer which is a white powdery substance.

These polymers have the power of taking up oxygen from the air to form insoluble or difficultly soluble oxides. They also have the power of recombining with more of the polymerizing salt, to reform the addition products so that the reaction may be said to be reversible and the salt to act in a catalytic capacity.

The polymerizing power seems to be characteristic of halide salts in which the positive element of the salt posseses residual, or so-called "secondary" valences. These are found in such salts as tin tetrachloride or tetra bromide, antimony pentachloride, titanium tetrachloride, boron trichloride, ferric chloride, antimony trichloride, and the like.

A more complete discussion of the chemistry involved in these reactions will be found in my dissertation entitled "Katalytische Polymerization von Cyclopentadiene und Indene", Zurich 1925; also, in an article in Liebig's Ann. der Chemie 447, 110 (1926) or in the Journal of Industrial and Engineering Chemistry, 18, 381 (1926).

I have discovered that rubber hydrocarbon may also be treated in a similar way by which important polymers analogous to the ones just described are obtained.

When rubber is treated with metallic salts, notably the halides, such as tin tetrachloride, antimony pentachloride, titanium tetrachloride, ferric chloride, and the like, the salt adds to the hydrocarbon to form definite addition products. The metallic chloride may then be split off and removed by appropriate means. The hydrocarbon remaining is deposited as a white, powdery or flake-like material totally different from ordinary rubber in all of its physical properties. If these reactions are effected in an inert atmosphere, more or less completely benzol-soluble polymers of rubber are formed. If air or oxygen is admitted during the reaction, a portion of the reaction product changes to powdery, insoluble oxides of polymers of rubber.

It is believed that in the process, the secondary valences of the metallic halide link themselves to the carbon atoms in the hydrocarbon to form the rubber-halide addition products. The addition product is then treated with alcohol, acetone, or water, or some other convenient agency and the halide splits off, leaving the polymer or oxide, depending upon the conditions under which the reactions take place. These latter may then be isolated by filtration.

Under suitable conditions the intermediate metallic halide addition products may be obtained as brown, vitreous, resin-like masses, analyses of which show that definite proportions by weight of the hydrocarbons and the halide salt, or of the rubber and the halide salt, have chemically combined.

When rubber and tin tetrachloride react at room temperature, a compound having the formula $(C_5H_8)_{10}SnCl_4$ was isolated. The reaction may be represented as follows:

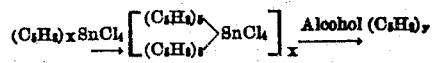

When the halide salt is split off by a suitable agency, such as alcohol, it is found that the $(C_5H_8)$ groups have polymerized to form $(C_5H_8)_y$, where $y$ is a larger value than X.

In practising my invention a solution of rubber, such as, rubber in benzene may be employed. A halide, such as stannic chloride is added to the solution and the mixture allowed to stand either in the presence or absence of air, as desired. At room temperature these materials will have completely reacted within twenty four hours. The reaction is much accelerated by the application of heat, and is found to work best if an excess of the chloride is present. The addition product of rubber and metallic halide may be isolated by evaporating the solvents under vacuum.

It is found that two white, powdery polymeric compounds of rubber are formed by precipitating the reaction mass with alcohol which causes the halide to be split out. One of the compounds is soluble in either hot or cold benzene, the other is soluble only in hot benzene. If the latter portion is alternately brought into solution and then chilled for a number of times, the liquid phase being poured off each time from the precipitate when the solution is chilled, the product finally becomes insoluble. This phenomenon is doubtless due to the fact that some of the soluble product is entrapped in the insoluble and it serves to peptize the latter, so that it dissolves in hot benzene, but the repeated decantations finally remove the soluble phase and there being no peptizing agent present, the insoluble phase no longer dissolves. It seems probable that these two polymers are formed from the two distinct hydrocarbon phases originally present in the rubber. (See work by E. A. Hauser, Chemical Abstracts 20, 677, 840 (1926).)

Both the addition product and the polymers gradually absorb oxygen from the air to produce white, powdery substances which appear to be oxides. There is thus a continuous increase in the weight of the mass.

When the polymers or addition products are heated in air to temperatures above their melting points they form upon cooling brittle, resinous substances resembling shellac.

Oxides, polymers and addition products may also be formed by the use of the various other metallic salts previously enumerated. It is, of course, necessary to select suitable solvents for the various halides which in themselves will not react with the halide. For example, when antimony pentachloride is used, carbon tetrachloride is an excellent solvent. Chloroform is a good solvent to use with ferric chloride. If titanim tetrachloride is employed, either chloroform or carbon tetrachloride may be used with good results.

It has been found that addition products may not only be formed in solutions of rubber, but may also be formed by adding halides to solid rubber. This is best accomplished by adding a solution of the salt to the rubber while it is being rolled in the mill. When such addtion is made, heat is evolved, and the hydro-carbon quickly sets into a tough mass.

Although certain theories are advanced herein to explain the chemistry involved in my invention, it is apparent that the value and novelty thereof are not dependent upon such theories. It is likewise obvious that various changes may be adopted in the method of practicing the invention without departing from the spirit thereof and only such limitations should be imposed, therefore, as are indicated by the appended claims.

What I claim is:

1. A method of treating rubber that comprises admixing a solution of rubber with a metallic halide in which the metal has at least one unsatisfied secondary valence, to form an addition product of the halide and the rubber hydrocarbon.

2. A method of treating rubber that comprises admixing a solution of rubber and a metallic halide in which the metal has a plurality of unsatisfied secondary valences to form an addition product of the halide and the hydrocarbon of the rubber.

3. A method of treating rubber that comprises admixing a solution of rubber and a metallic halide to form an addition product of the halide and the rubber.

4. A method of treating rubber that comprises treating a solution of rubber with a halide, salt of a metal where the halogen has an atomic weight of at least 35.46.

5. A method of treating rubber that comprises treating a solution of rubber with a halide salt of an amphoteric metal where the halogen has an atomic weight of at least 35.46.

6. A process of treating rubber which comprises admixing a solution of rubber with the halide salt of a metal having a plurality of secondary valences to cause an exothermic reaction.

7. A process of treating rubber which comprises admixing a solution of rubber with tin tetrachloride to cause an exothermic reaction between the salt and the rubber.

8. A process of treating rubber which comprises admixing a solution of rubber with a halide salt of an amphoteric metal.

9. A method of treating rubber which comprises causing a solution of rubber in an inert solvent to react with a halide of an amphoteric metal and subsequently splitting off the halide.

10. A method of treating rubber which comprises causing a solution of rubber in an inert solvent to react with a halide of tin and subsequently splitting off the halide.

In witness whereof, I have hereunto signed my name.

HERMAN A. BRUSON.